United States Patent
Parham et al.

(10) Patent No.: US 8,037,181 B2
(45) Date of Patent: Oct. 11, 2011

(54) RE-PARTITIONING DIRECTORIES

(75) Inventors: Jeffrey Parham, Redmond, WA (US); Mark Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2436 days.

(21) Appl. No.: 10/184,870

(22) Filed: Jun. 28, 2002

(65) Prior Publication Data

US 2004/0003086 A1    Jan. 1, 2004

(51) Int. Cl.
*G06F 15/173* (2006.01)
(52) U.S. Cl. .................................. 709/226; 709/229
(58) Field of Classification Search .................. 709/226, 709/229
See application file for complete search history.

(56) References Cited

U.S. PATENT DOCUMENTS

| | | | |
|---|---|---|---|
| 5,918,229 A * | 6/1999 | Davis et al. | 707/10 |
| 5,956,718 A * | 9/1999 | Prasad et al. | 707/10 |
| 6,052,724 A * | 4/2000 | Willie et al. | 709/223 |
| 6,119,122 A * | 9/2000 | Bunnell | 707/102 |
| 6,343,296 B1 * | 1/2002 | Lakhamraju et al. | 707/103 R |
| 6,453,326 B1 | 9/2002 | Parham et al. | |
| 6,457,011 B1 | 9/2002 | Brace et al. | |
| 6,564,370 B1 * | 5/2003 | Hunt | 717/122 |
| 6,643,670 B2 | 11/2003 | Parham et al. | |
| 6,654,771 B1 | 11/2003 | Parham et al. | |
| 6,697,824 B1 * | 2/2004 | Bowman-Amuah | 709/229 |
| 2002/0099728 A1 | 7/2002 | Lees et al. | |
| 2002/0120637 A1 | 8/2002 | Parham et al. | |
| 2002/0120770 A1 | 8/2002 | Parham et al. | |

OTHER PUBLICATIONS

Microsoft® Windows® Active Directory™ in the Outward-Facing Role (White Paper). Microsoft Corporation, Redmond, Washington, Dec. 10, 2001. Available: <http://download.microsoft.com/download/win2000srv/Utility/1.0/NT5/EN-US/outward-facingad.exe> (executable archive file; includes accompanying source code and binary code, governed by End-User License Agreement), May 26, 2004.
"Clustering Firewalls with Convoy and FireWall-1," Copyright 1997, 98 by Valence Research, Inc., Beaverton, Oregon, 4 pages.

* cited by examiner

*Primary Examiner* — John Follansbee
*Assistant Examiner* — Glenford Madamba
(74) *Attorney, Agent, or Firm* — Workman Nydegger

(57) ABSTRACT

A new method and framework for re-partitioning directory servers supporting user services in a site that receives access requests from users. According to the present invention, a management server transfers groups of directory objects from original directory servers to newly added directory servers without service interruption to users of the site. The directory objects are stored in categorical groups such that the directory objects in each group share an attribute. According to the present invention, certain groups in the original directory servers are identified for migration to the newly added servers based on a load-balancing scheme. In one embodiment, the identified groups are marked for migration to limit access to the directory objects therein. After successfully being migration, the groups are unmarked and access is resumed. In another embodiment, the management server includes a table storing location information that is updated to indicate successful transfer of the identified group of directory objects from the original server to the newly added server.

36 Claims, 9 Drawing Sheets

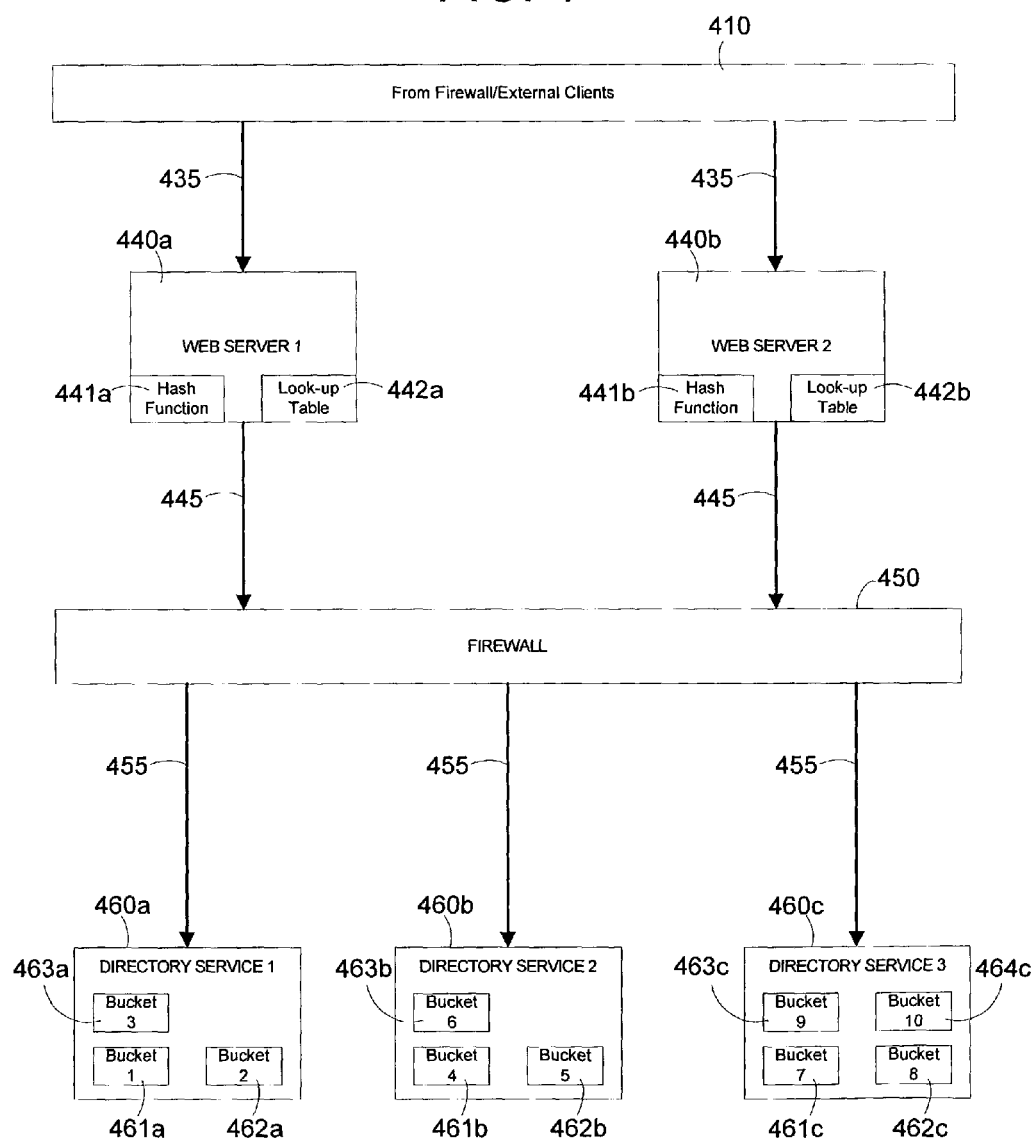

FIG. 4a

| First Character of User ID | Bucket No. |
|---|---|
| A | 1 |
| B | 1 |
| C | 2 |
| D | 2 |
| E | 2 |
| F | 3 |
| G | 3 |
| H | 3 |
| I | 4 |
| J | 4 |
| K | 4 |
| L | 5 |
| M | 5 |
| N | 5 |
| O | 6 |
| P | 6 |
| Q | 7 |
| R | 7 |
| S | 8 |
| T | 9 |
| U | 9 |
| V | 9 |
| W | 10 |
| X | 10 |
| Y | 10 |
| Z | 10 |

| Bucket No. | Directory Service No. |
|---|---|
| 1 | 1 |
| 2 | 1 |
| 3 | 1 |
| 4 | 2 |
| 5 | 2 |
| 6 | 2 |
| 7 | 3 |
| 8 | 3 |
| 9 | 3 |
| 10 | 3 |

RE-PARTITIONING DIRECTORIES

AREA OF THE INVENTION

The invention relates generally to the management of directory objects in a multi-server distributed environment and, more particularly, to a method of implementing re-partitioning of directory objects across multiple directory servers.

BACKGROUND OF THE INVENTION

In the field of computer networking, many efforts have been made to develop the most efficient and reliable way for managing the millions of users served by large-scale Internet sites. In particular, the problem of authenticating and authorizing users has been a challenge given the number and density of users attempting access to certain sites. To manage users, large outward-facing sites employ a "directory service" to store user authentication and role information that must be frequently read. Large outward-facing sites include, for example, customer-oriented Web sites such as e-mail Web sites (e.g., Microsoft Hotmail), shopping Web sites (e.g., Ebay) and banking/investing Web sites (e.g., Merrill Lynch). The directory service authenticates and authorizes users by validating certain supplied credentials such as a user ID and/or password. An implementation example of such a directory service is found in the MICROSOFT ACTIVE DIRECTORY service (a product of Microsoft Corp. of Redmond, Wash.). Directory services allow organizations to centrally manage and share information on network resources and users while acting as the central authority for network security.

A goal of directory services is to provide uninterrupted and continuous service to users attempting access to the outward-facing site. Another goal of directory services is scalability, that is, growth to meet user demand and business complexity. It is not uncommon for outward-facing sites to change over time, starting small and growing incrementally to keep up with demand. To manage the growth, outward-facing sites increase the number of servers performing authentication services. A key architectural element of highly scalable outward-facing sites is "directory partitioning." A directory partition is a set consisting of directory objects that are managed as a group such that the directory objects are backed-up, restored and served together. Each directory object belongs to only one group. Directory partitioning entails distributing directory objects across the various partitions in the outward-facing site. A single partition can start very small and grow to cover over ten million directory objects. When a more complex organization structure is required, multiple partitions are joined together for easy searching. Partitioning reduces the unit of failure such that if one partition fails, other partitions continue serving directory objects. Partitioning further increases performance of the outward-facing site in that if one machine serves N requests per second, than a directory with M partitions serves M*N requests per second without resorting to replication.

When using partitioning, there exists a mechanism by which a key for a directory object (such as a user ID submitted to the Web server) can be mapped to the partition holding the directory object. This process is called "partition location." A popular outward-facing method for partition location is referred to as "hashing." As is known in the art, hashing refers to the process of applying a hashing scheme or algorithm to yield an equal distribution of keys (e.g., user IDs) across partitions (also referred to as "hash buckets"). For purposes of partitioning user IDs, directory objects can be partitioned according to any rational hashing scheme. For example, a simplistic hashing scheme partitions all users with user IDs beginning with the letters A to C on partition 1, letters D to G on partition 2, etc. Locating the proper partition at runtime using hashing can be performed by building the hashing logic into to the application code running on the front-end Web servers.

Once a hashing solution is deployed, the amount of data held in a given partition grows linearly with respect to the total amount of data in the system. If an e-business stores user data in the partition and the user base doubles, so does the size of each of the partitions. In some cases data can grow beyond what the original partitions and original servers can service and the data must be "re-partitioned." Repartitioning entails adding new servers to the outward-facing site and re-distributing the groups of directory objects across the original and newly added servers in a way that balances the data load across the servers. One possible method to reduce the need to re-partition directory objects is simply to over partition directory objects from the outset. Over partitioning directory objects requires utilizing additional hardware (i.e., back-end servers) to manage small partitions. As the service and the partitions grow, more processors, memory, disks, etc. may be added to the hardware to increase the capacity of the partition. In some cases, the need to ever re-partition the data store can be avoided entirely.

If ample hardware is not available, however, re-partitioning must be employed in order to adequately support increased user demand. One method for re-partitioning directory services known in the prior art requires that the outward-facing site be shutdown temporarily during which time administrators re-partition the directory servers. Shutting down a site that maintains access for large numbers of users is often not a viable option. Another method for re-partitioning directory services entails creating a read/write replica on a newly added server while the directory services remain operational. This scheme, referred to as a "loose consistency model," entails reading replica information on the original server and propagating that information to the new partition. Because of the inherent latency in propagating the information, there is no guarantee that the information on the new server will be consistent with the information on the original server.

In view of the foregoing, it can be seen that there is a need for a method for re-partitioning directories according to a model that ensures reliability of information without service interruption.

SUMMARY OF THE INVENTION

The present invention comprises a new method and framework for re-partitioning directories in a site that ensures that directory objects are migrated from original directory servers to new directory servers without service interruption to users of the site.

More particularly, a re-partitioning framework embodying the present invention includes a plurality of directory servers and a management server connected via data links, firewalls and the Internet to one or more users requesting access to the site. Each directory server holds user account information stored in the form of directory objects separated into categorical groups based on an attribute of the user. The groups of directory objects are distributed across the various directory servers according to a partitioning model. The partitioning model can be any acceptable scheme for distributing the groups of directory objects across the directory servers in a way that balances the load. In one embodiment of the invention, a mapping algorithm is used to distribute the directory objects into logical groups.

According to aspects of the present invention, as the number of directory objects in the various groups increases to a level that affects usability of the site, it becomes necessary to add additional directory servers to the site. Once new servers are added to the site, the directory servers are re-partitioned in an effort to rebalance the load across the original and newly added servers. In one embodiment of the invention, an analysis of the distribution of directory objects is conducted to determine a strategy for re-partitioning the groups of directory objects. During that analysis certain groups of directory objects are identified for migration from the original servers to the newly added servers.

According to another aspect of the present invention, a group of directory objects identified for migration is first marked to limit access to the directory objects during the migration process. Limiting access entails limiting write access or read and write access to the directory objects during the transfer. Once the identified group is successfully transferred from the original server to the newly added server, the identified group is unmarked to allow full read and write access to the directory objects.

According to yet another aspect of the invention, the management server includes a table for storing information identifying a directory server location for each group of directory objects. After a group is successfully transferred from the original server to the newly added server, the table is updated to reflect that the group has been transferred.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4 is a block diagram illustrating an exemplary networked computer system with several directory servers for facilitating re-partitioning of directories;

FIG. 4a illustrates, in table form, sample results from applying a hash function to a set of user IDs in accordance with one embodiment of the present invention;

FIG. 5 depicts an exemplary lookup table, illustrating partitioning in accordance with one embodiment of the present invention;

DETAILED DESCRIPTION OF ILLUSTRATIVE EMBODIMENTS

In some situations, it is beneficial to re-partition directory objects across directory servers with zero replication latency and without temporary loss of the system. It can be seen that there is a need for a method for effectuating re-partitioning directories such that applications, which authenticate and authorize users, remain operational and reliable during the re-partitioning process.

Figure 1:
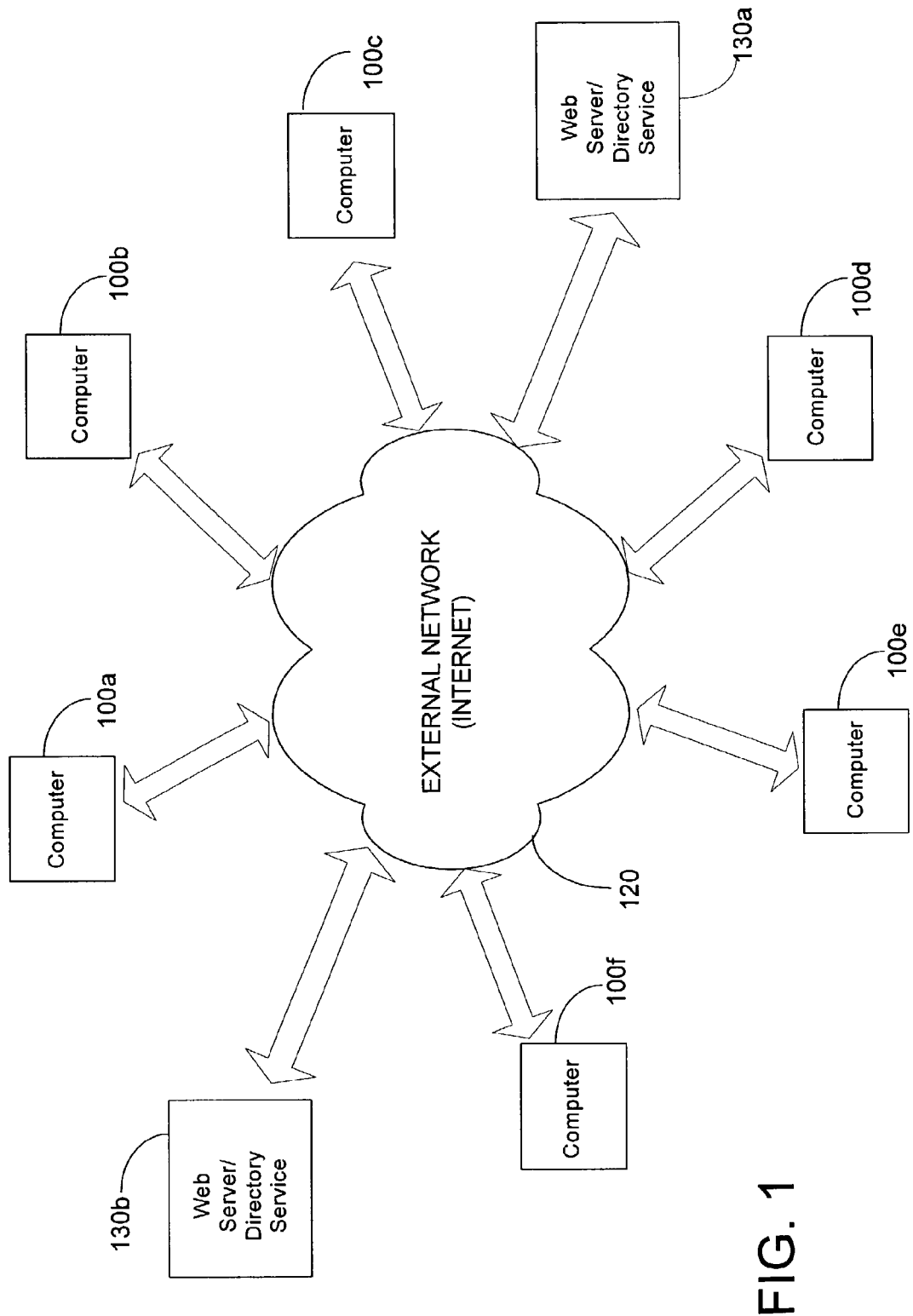
FIG. 1 is an example of a networked computer system in which aspects of the present invention and/or portions thereof may be incorporated.

In an embodiment of the present invention, a directory re-partitioning technique comprises server communication system software executed within a server computer operating environment such as the one depicted in FIG. 1, and in particular one that is configured to support potentially hundreds of thousands of concurrent network connections and data requests. Such a computing environment is potentially present in popular Web site server configurations that exist today. FIG. 1 illustratively depicts an example of a suitable operating environment within which the invention is implemented. The example network includes several computers 100*a-f* communicating with one another over a network 220, represented as a cloud. Network 120 may include any of many well-known components, such as routers, gateways, hubs, etc. and may allow computers 100*a-f* to communicate via wired and/or wireless media. The example network also includes a firewall protected Web server/directory service 130*a-b* connected to network 120.

The invention is operational with numerous other general-purpose or special-purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like, either alone or in combination.

The invention may be described in the general context of computer-executable instructions, such as program modules, being executed by a computer. Generally, program modules include routines, programs, objects, components, data structures, etc. that perform particular tasks or implement particular abstract data types. A program may include one or more program modules. The invention may also be practiced in distributed computing environments where tasks are performed by remote processing devices that are linked through a communications network. In a distributed computing environment, program modules may be located in both local and remote computer storage media including memory storage devices.

Figure 2:
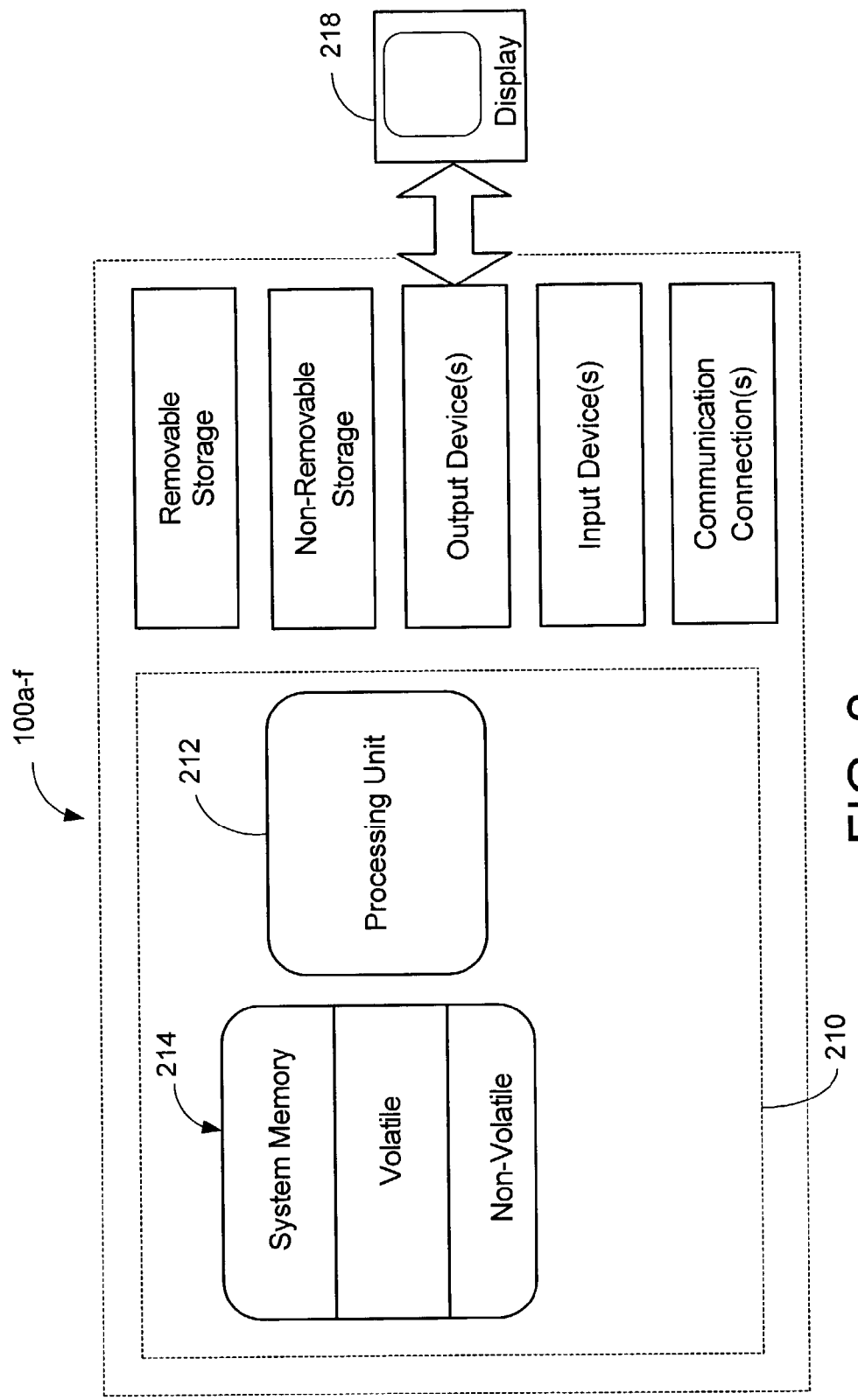
FIG. 2 is a block diagram illustrating a general purpose computer in which aspects of the present invention and/or portions thereof may be incorporated.

Referring to FIG. 2, an example of a basic configuration for a computer on which the system described herein may be implemented is shown. In its most basic configuration, computers 100*a-f* typically include at least one processing unit 212 and memory 214. Depending on the exact configuration and type of the computer, the memory 214 may be volatile (such as RAM), non-volatile (such as ROM or flash memory) or some combination of the two. This most basic configuration is illustrated in FIG. 2 by dashed line 210. Additionally, the computer may also have additional features/functionality.

For example, computers 100a-f may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by computers 100a-f. Any such computer storage media may be part of computers 100a-f.

Computers 100a-f may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computers 100a-f may also have input devices such as a keyboard, mouse, pen, voice input device, touch input device, etc. Output devices such as a display 218, speakers, a printer, etc. may also be included. All these devices are well known in the art and need not be discussed at length here.

Figure 3:
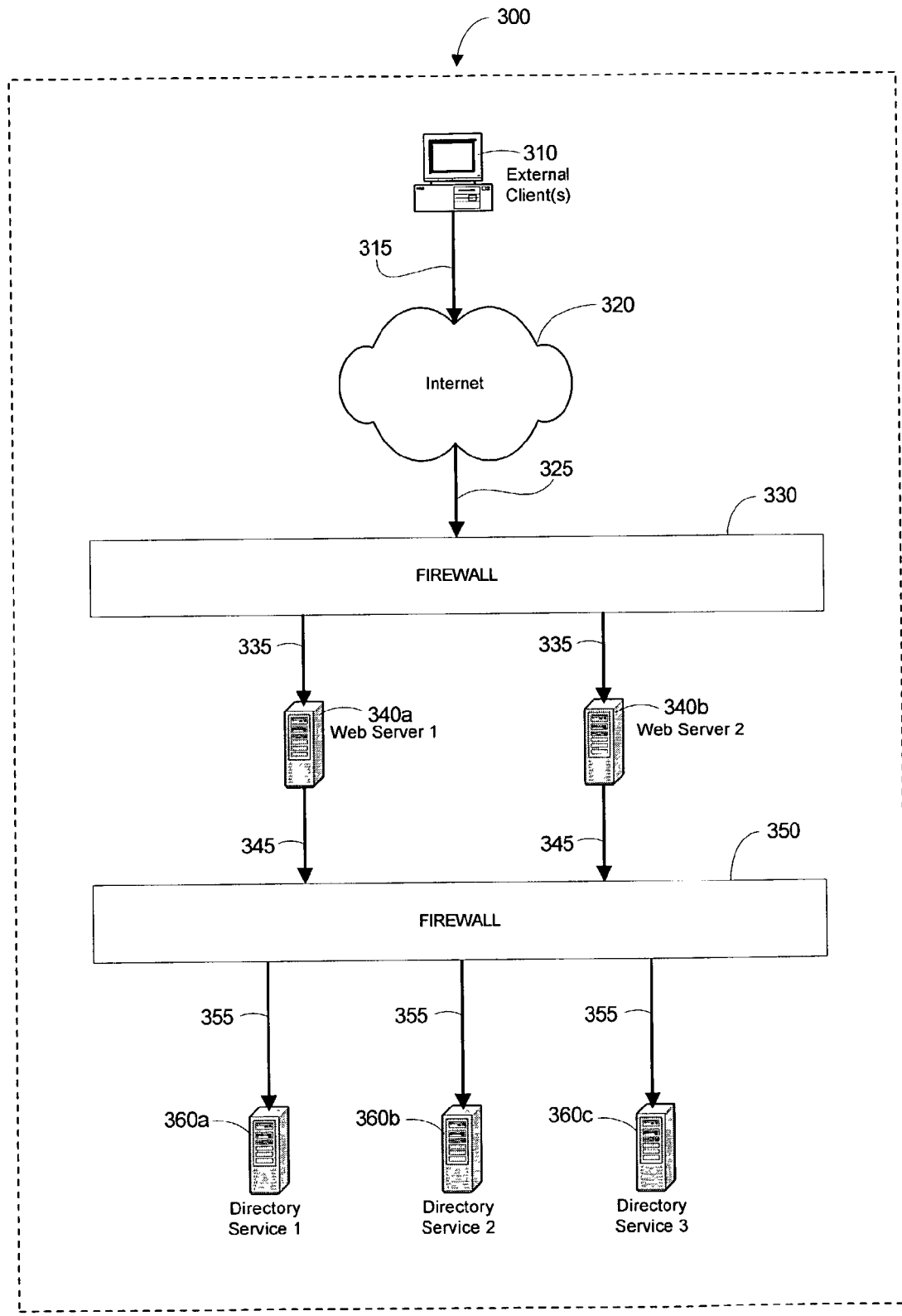
FIG. 3 depicts an exemplary networked computer system with several directory servers for facilitating re-partitioning of directory services.

Having described an exemplary computing environment for executing a method for re-partitioning directories in an outward-facing directory environment embodying the present invention, attention is directed to FIG. 3 that depicts an exemplary computer network application environment within which the present invention is practiced. As shown in FIG. 3, networked computer system 300 includes one or more external client computers 310 connected via data links 315, 325, 335, Internet 320 and firewall 330 to a cluster of Web servers 340a, 340b (referenced as Web Server 1 and Web Server 2). Data links 315, 325, 335 comprise any appropriate data link, for example, a local area network or a wide area network. Various data links are employed in alternative embodiments of the invention. Firewall 330 comprises any appropriate security component that filters traffic by packet type and excludes all network traffic except for permitted source/destination IP addresses and ports. Web servers 340a, 340b comprise any appropriate computer that delivers Web pages having an IP address and/or domain name. As those skilled in the art will readily appreciate, each Web server 340a, 340b embodies its own IP address. Additionally, a single Web server may host multiple Web sites and a cluster of Web servers may host a single Web site. An implementation example of such a Web server is the series of servers that deliver the MSN HOTMAIL (i.e., www.hotmail.com) (a Web-based e-mail product of Microsoft Corp. of Redmond, Wash.). An exemplary computer network application environment contains one or more Web servers that support and deliver Web pages.

As further depicted in FIG. 3, Web servers 340a, 340b are connected via data links 345, 355 and firewall 350 to a series of directory servers 360a, 360b, 360c (referenced as Directory Service 1, Directory Service 2 and Directory Service 3). Like firewall 330, firewall 350 comprises any appropriate security component that filters traffic by packet type and excludes all network traffic except for permitted source/destination IP addresses and ports. Directory servers 360a, 360b, 360c comprise any appropriate directory service interface that manages network resources such as adding new users, managing printers, and locating resources throughout the distributed computing environment. An implementation example of such a directory service interface is found in the MICROSOFT ACTIVE DIRECTORY service (a product of Microsoft Corp. of Redmond, Wash.).

In an embodiment of the present invention as shown in FIG. 3, an external client 310 requests access to a Web server 340a, 340b by entering a URL ("uniform resource locator) in a Web browser (i.e., a software application used to locate and display Web pages). An implementation example of such a Web browser is found in the MICROSOFT INTERNET EXPLORER (a product of Microsoft Corp. of Redmond, Wash.). As those skilled in the art will readily appreciate, a URL may be associated with more than one IP address. Consequently, a request to access Web server 340a, 340b initiated by the external client 310 is routed by conventional means through data links 315, 325 and Internet 320 to the proper Web server 340a, 340b by resolving the URL entered by the external client 310. As depicted in FIG. 3, Web servers 340a, 340b are protected by firewall 330 such that firewall 330 evaluates all access requests from external client 310 prior to processing. Access requests that are approved by firewall 350 are then forwarded to the appropriate directory server 360a, 360b, 360c based on a determination made by Web server 340a, 340b. As will be explained further herein below, Web server 340a, 340b utilizes a "key," such as a user ID, to identify the proper partition location. Thereafter, access requests are forwarded to the designated directory server 360a, 360b, 360c.

Attention is directed to FIG. 4 that depicts a block diagram illustrating the exemplary networked computer system depicted in FIG. 3. FIG. 4 illustratively depicts a cluster of Web servers 440a, 440b communicatively coupled via data links 445, 455 to a series of directory servers 460a, 460b, 460c that are protected from intrusions by a firewall 450. Web servers 440a, 440b are replicas of each other and facilitate management of the directory servers 460a, 460b, 460c. Access requests from external clients 410 are forwarded across data link 435 to one of the Web servers 440a, 440b based on availability. Upon receiving an access request from an external client 410, Web server 440a, 440b engages partition locator 442a, 442b to determine the partition location (i.e., directory server and bucket) associated with the access request. As will be explained further herein below, each directory server holds web user account information that is stored in a partition according to a "partitioning model." The partitioning model can be any acceptable scheme for dividing the web user account information (referred to as a "directory object") across the directory servers 460a, 460b, 460c. Each directory object (e.g., user, group, configuration object, etc.) is a member of a single partition.

In one embodiment of the invention, the partitioning model includes a hash function 441a, 441b that generates an equal distribution of keys (e.g., user IDs). The hash function can be any acceptable algorithm adopted by the site that distributes the keys equally into groups (also referred to as "hash buckets") such that the number of groups or hash buckets exceeds the number of physical partitions (i.e., directory servers 460a, 460b, 460c). Using a partitioning model that "over-bucketizes" the keys assists in limiting the amount of information migrated during the re-partitioning process as well as the amount of time needed to complete the migration process. Because outward-facing sites can grow to huge proportions, in one embodiment of the invention, the hash function takes into consideration the maximum time allowable for migrating a single bucket, the rate at which individual objects in a hash bucket can be migrated from one directory server to another and the maximum capacity of a hash bucket. For example, if the migration rate is 100 directory objects per second and the maximum time allowable for migration of a single bucket is 30 minutes, then the maximum capacity of a bucket is 180,000 directory objects (i.e., 30*60*100). In this example, a system that scales to 1 billion directory objects will require 5,556 hash buckets (i.e., 1,000,000,000/180,000).

For purposes of describing the re-partitioning process, FIG. 4a illustratively depicts a simplified hash function that maps alphabetic user IDs to ten hash buckets. The table 470 includes a first character of the user ID field 471 corresponding to each letter of the alphabet and a bucket number field 472 that identifies the group or hash bucket that users are assigned to according to the hashing algorithm. As depicted, all users with user IDs beginning with the letters A-B are assigned to hash bucket 1, all users with user IDs beginning with the letters C-E are assigned to hash bucket 2, all users with user IDs beginning with the letters F-H are assigned to hash bucket 3, etc.

In another embodiment of the invention, the partitioning model is designed to distribute the groups or hash buckets across available partitions (i.e., directory servers 460a, 460b, 460c). Turning back to FIG. 4, illustrated therein is an embodiment wherein the hash function generates ten hash buckets distributed across three physical partitions. As depicted, hash buckets in FIG. 4 are distributed as follows: Directory Service 1 460a has three hash buckets 461a, 462a, 463a (i.e., Bucket 1, Bucket 2, Bucket 3); Directory Service 2 460b has three hash buckets 461b, 462b, 463b (i.e., Bucket 4, Bucket 5, Bucket 6); and Directory Service 3 460c has four hash buckets 461c, 462c, 463c, 464c (i.e., Bucket 7, Bucket 8, Bucket 9, Bucket 10). Using the distribution in FIG. 4a reveals the following: users with user IDs beginning with the letters A-H are held on Directory Service 1 460a such that letters A-B are held in hash bucket 1 461a, letters C-E are held in hash bucket 2 462a, and letters F-H are held in hash bucket 3 463a, users with user IDs beginning with the letters I-P are held on Directory Service 2 460b such that letters I-P are held in hash bucket 4 461b, letters L-M are held in hash bucket 5 462b, and letters N-P are held in hash bucket 6 463b, and users with user IDs beginning with the letters Q-Z are held on Directory Service 3 460c such that letters Q-R are held in hash bucket 7 461c, letter S is held in hash bucket 8 462c, letters T-V are held in hash bucket 9 463c and letters W-Z are held in hash bucket 10 464c.

According to one aspect of the present invention, the mapping of hash buckets to directory servers is stored in a "look-up table" 442a, 442b at Web servers 440a, 440b. The look-up table 442a, 442b provides a mechanism for performing partition location. Depicted in FIG. 5 is an exemplary look-up table 442 representing the partition model shown in FIG. 4. The look-up table 442 includes a bucket number field 501 that identifies the hash bucket and a directory service number field 502 that identifies the physical partition. As is shown in FIG. 5, Buckets 1-3 are located on Directory Service 1, Buckets 4-6 are located on Directory Service 2 and Buckets 7-10 are located on Directory Service 3. According to an embodiment of the invention, authorization and authentication information for a user is located in only one partition and bucket. Locating the information (i.e., partition location) is accomplished by using hash function 441a, 441b in conjunction with the look-up table 442a, 442b. For example, a request for access from a user having a user ID of "Thompson" is received by Web Server 1 440a. Web Server 1 440a runs the hash function 441a on "T" and identifies Bucket 9 (see FIG. 4a). Web Server 1 440a then locates Bucket 9 463c in the look-up table 442a to determine that Thompson's authorization information is located on Directory Service 3 460c.

Figure 6:
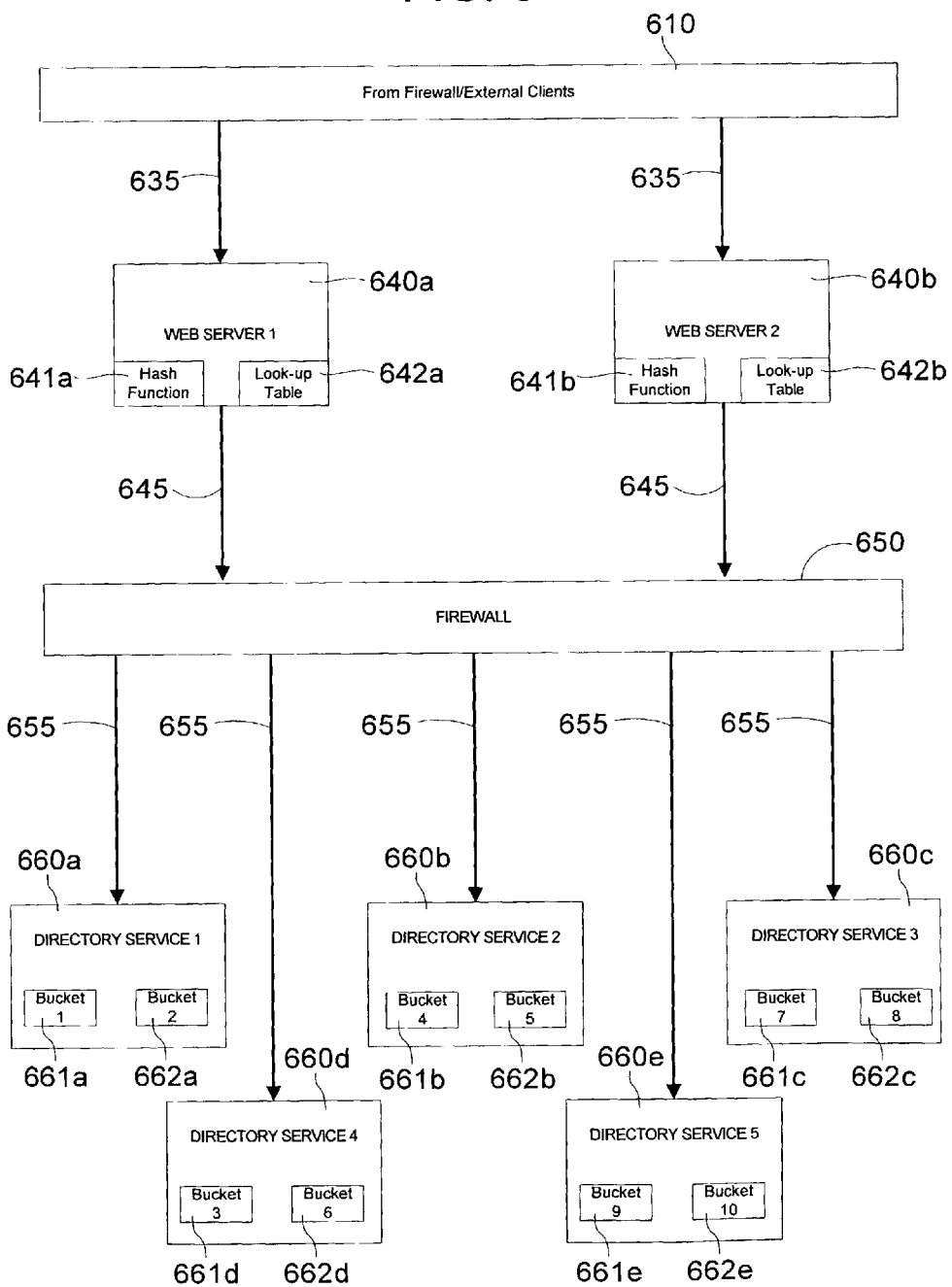
FIG. 6 is a block diagram illustrating an exemplary networked computer system with several directory servers for facilitating re-partitioning of directories.

As is typical in outward-facing directories, as the user base grows the number of directory objects in each partition/bucket increases. In some circumstances, the user base grows to a point beyond which the original partitions can adequately service users and the directory objects must be re-partitioned to new directory servers. FIG. 6 depicts a block diagram illustrating the addition of two new data partitions (referenced as Directory Service 4 and Directory Service 5) to the exemplary networked computer system illustrated in FIG. 4. Like FIG. 4, FIG. 6 illustratively depicts a cluster of Web servers 640a, 640b communicably coupled via data links 645, 655 to a series of directory servers 660a, 660b, 660c, 660d, 660e that are protected from intrusions by a firewall 650. Access requests from external clients 610 are forwarded across data link 635 to one of the Web servers 640a, 640b. Hash buckets in FIG. 6 are distributed as follows: Directory Service 1 660a has two hash buckets 661a, 662a; Directory Service 2 660b has two hash buckets 661b, 662b; Directory Service 3 660c has two hash buckets 661c, 662c, Directory Service 4 660d has two hash buckets 661d, 662d and Directory Service 5 660e has two hash buckets 661e, 662e.

According to one aspect of the invention, re-partitioning entails determining a strategy for migrating hash buckets from the original partition to the new partition. The migration strategy is any acceptable strategy that results in a uniform distribution of users across the new expanded set of partitions while minimizing the number of user objects moved. For example, the migration strategy may take into consideration the maximum time allowable for migrating a certain hash bucket, the rate at which individual objects in the hash bucket will be migrated from one directory server to another and the maximum capacity of the hash bucket.

For example, the migration strategy may reveal that a distribution of two buckets per directory server is optimal. This distribution is accomplished by removing one hash bucket 463a from Directory Service 1 460a, one hash bucket 463b from Directory Service 2 460b and two buckets 463c, 464c from Directory Service 3 460c (see FIG. 4). The hash buckets are migrated to the new partitions (i.e., Directory Service 4 and Directory Service 5) such that hash bucket 3 463a is migrated to Directory Service 4 660d, hash bucket 661d, hash bucket 6 463b is migrated to Directory Service 4 660d, hash bucket 662d, hash bucket 9 463c is migrated to Directory Service 5 660e, hash bucket 661e and hash bucket 10 464c is migrated to Directory Service 4 660e, hash bucket 664e. The results yielded by the new distribution after re-partitioning are stored in the look-up tables 642a, 642b at Web servers 640a, 640b in order to facilitate user authorization.

Figure 7:
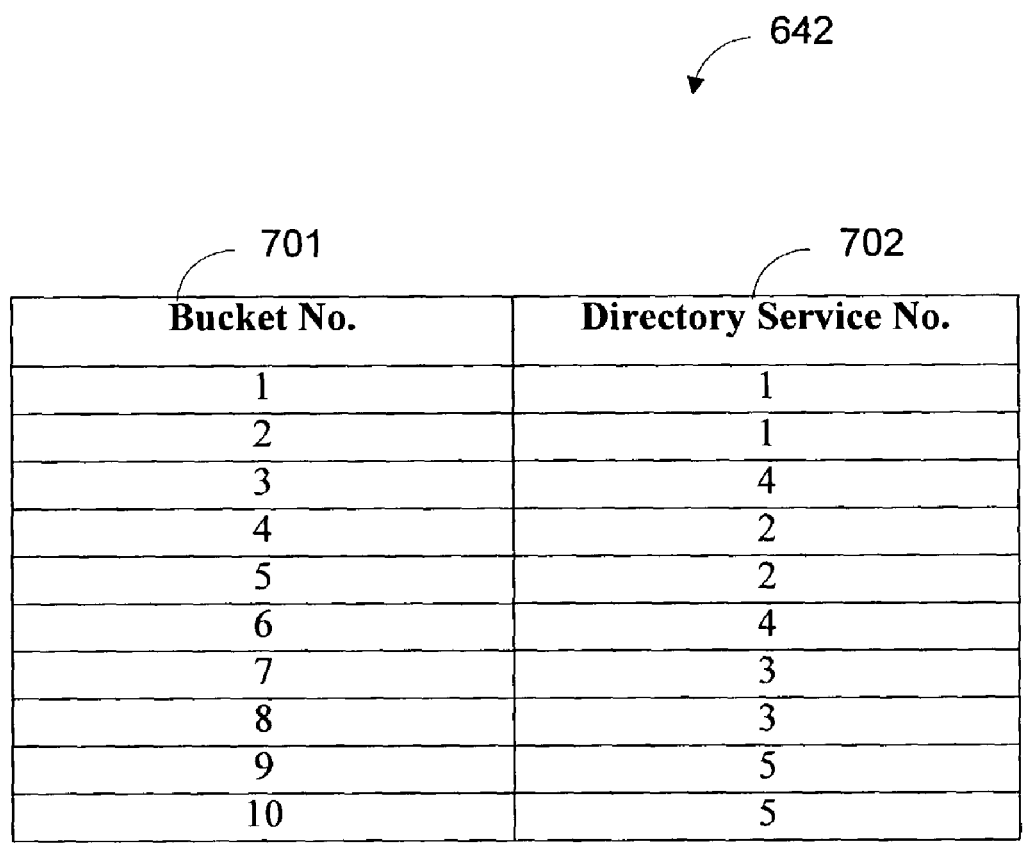
FIG. 7 depicts an exemplary lookup table, illustrating re-partitioning in accordance with one embodiment of the present invention.

Depicted in FIG. 7 is an exemplary look-up table 642 representing the distribution of groups resulting from successful re-partitioning as depicted in FIG. 6. The look-up table 642 includes a bucket number field 701 that identifies the hash bucket and a directory service number field 702 that identifies the physical partition. As is shown in FIG. 7, re-partitioning of buckets results in the following distribution: Buckets 1-2 are located on Directory Service 1, Bucket 3 is located on Directory Service 4, Buckets 4-5 are located on Directory Service 2, Bucket 6 is located on Directory Service 4, Buckets 7-8 are located on Directory Service 3 and Buckets 9-10 are located on Directory Service 5.

Using the results of hashing function 641 in conjunction with look-up table 642 reveals the following: all users with user IDs beginning with the letters A-E are held on Directory Service 1 660*a* such that letters A-B are held in hash bucket 1 661*a* and letters C-E are held in hash bucket 2 662*a*, all user IDs beginning with the letters I-M are held on Directory Service 2 660*b* such that letters I-K are held in hash bucket 4 661*b* and letters L-M are held in hash bucket 5 662*b*, all user IDs beginning with the letters Q-S are held on Directory Service 3 660*c* such that letters Q-R are held in hash bucket 7 661*c* and letter S is held in hash bucket 8 662*c*. With regard to the new partitions depicted in FIG. 7, all user IDs beginning with the letters F-H and N-P are held on Directory Service 4 660*d* such that letters F-H are held in hash bucket 3 661*d* and letters N-P are held in hash bucket 6 662*d* and all user IDs beginning with the letters T-Z are held on Directory Service 5 660*e* such that letters T-V are held in hash bucket 9 661*e* and letters W-Z are held in hash bucket 10 662*e*. Using the example from above, a request for access from a user having a user ID of "Thompson" is received by Web Server 1 640*a*. Web Server 1 640*a* runs the hash function 641*a* on "T" and identifies Bucket 9 (see FIG. 4*a*). After re-partitioning, Web Server 1 640*a* then locates Bucket 9 in the look-up table 642*a* to determine that Thompson's authorization information is now located on Directory Service 5.

Figure 8:
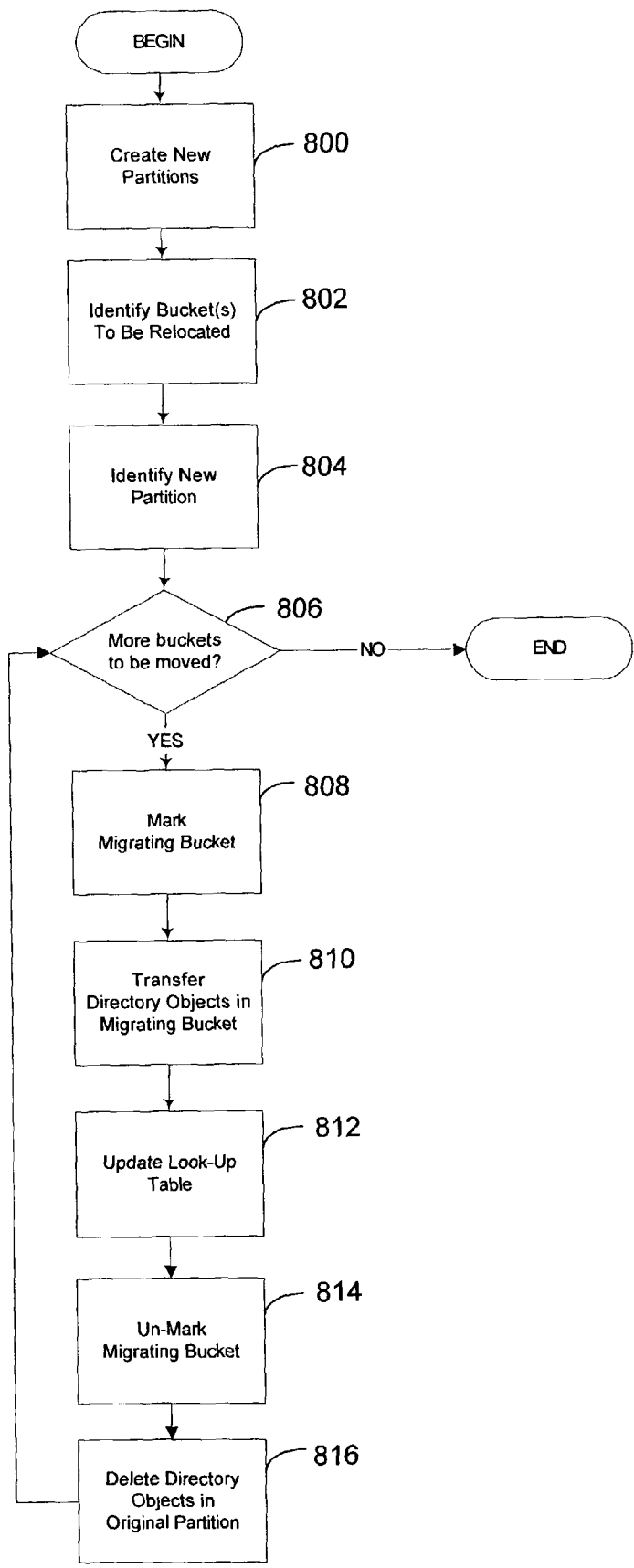
FIG. 8 is a flow diagram of an exemplary re-partitioning process in accordance with one embodiment of the present invention.

Having described structures that support an exemplary re-partitioning technique embodying the present invention, attention is now directed to FIG. 8 that depicts a set of steps performed by an outward-facing directory re-partitioning the data store. The steps described herein below are exemplary. As those skilled in the art will readily appreciate, the present invention can be carried out in a variety of manners and the steps described herein below can be rearranged and modified in accordance with alternative embodiments of the present invention.

The procedure begins at step 800 wherein new servers are added to the outward-facing site. In step 802, all hash buckets being migrated to the new servers are identified and in step 804, a determination is made identifying the new server to which each migrating hash bucket is being moved. According to the invention, the server selection determination should result in a uniform distribution of users across the newly expanded set of partitions while minimizing the number of users being moved.

Next, in steps 806 to 816, each migrating hash bucket is moved to the new partition. In step 806, a determination is made whether any more hash buckets are to be moved. If yes, the procedure moves to step 808 wherein the hash bucket is marked for migration. Marking a hash bucket for migration limits the read and/or write access to the hash bucket according to a predefined migration strategy. According to one embodiment of the invention, a suitable migration strategy is any strategy that manages temporary inconsistencies of user objects during the physical migration. For example, a user object being migrated might exist in the original partition, the new partition, or both during the migration process. As such, the migration strategy ensures that updates/writes to the user objects attempted during migration are denied. In one embodiment of the invention, only write access to user objects in the migrating hash bucket are disallowed. According to this embodiment, users are allowed to log in to the site, but not change their password. In another embodiment of the invention, both read and write access to user objects in the migrating hash bucket are disallowed. This embodiment, for example, denies users the ability to both log in to the site and change their password.

After the hash bucket is marked for migration, in step 810 the hash bucket is physically migrated to the new partition. Physical migration entails moving the directory objects in the hash bucket from the original partition to the new partition. In step 812, the look-up table is updated to reflect the new partition for the directory objects in the migrated hash bucket and in step 814, the migrated hash bucket is unmarked allowing read and write access to resume. Lastly, in step 816, the hash bucket in the original partition is deleted. The procedure then returns to step 806 where a determination is once again made whether any addition hash buckets are slated for migration to a new partition. If no, the migration procedure ends.

It can thus be seen that a new and useful method for re-partitioning directory objects in an outward-facing directory has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. In a distributed network directory, a method for re-partitioning directory servers supporting user services in a site receiving access requests from users for user data, the site comprising the directory servers, where at least a first directory server stores directory objects that include the user data, the directory objects being stored in categorical groups such that the directory objects in each group share an attribute, and a management server communicatively coupled to the directory servers having a table storing information identifying a location for each group of objects, the method comprising the steps of:

identifying a group of directory objects in one of the directory servers for migration to another directory server;

selecting a second directory server capable of storing the identified group of directory objects;

marking the identified group of directory objects to limit, for requests from users directed to reading and/or writing user data stored within respective directory objects, access to the directory objects while transferring the identified group of directory objects to the second directory server, which limits read and/or write access to user data stored in the directory objects of the identified group during a period of time during which the identified group of directory objects is temporarily marked;

transferring the identified group of directory objects from the first directory server to the second directory server;

updating the location information in the table to indicate the identified group of directory objects is located at the second directory server; and deleting the identified group of directory objects from the first directory server.

2. The method of claim 1 wherein the identified group of directory objects is transferred to the second directory server without service interruption to the users of the site.

3. The method of claim 2 further comprising:

unmarking the identified group of directory objects to permit read and/or write access to the user data within the directory objects after transfer of the identified group of directory objects to the second directory server is completed.

4. The method of claim 3 wherein write access is further limited prior to transferring the identified group of directory objects by denying all requested writes and updates to user data within the directory objects in the identified group of directory objects while the identified group of directory objects is marked.

5. The method of claim 3 wherein read access and write access is limited prior to transferring the identified group of directory objects.

6. The method of claim 1 wherein the step of selecting the second directory server comprises the steps of:
analyzing a distribution of directory objects across the directory servers; and
selecting the second directory server so that the distribution of directory objects is balanced.

7. The method of claim 1 wherein the directory objects comprise user authorization information, the user authorization information comprising user data relating to the users requesting access to the site.

8. The method of claim 7 wherein the user data comprises a unique user ID and password.

9. The method of claim 8 wherein the user data further comprises a notice indicating whether the user requesting access is authorized to access the site.

10. The method of claim 1 wherein the management server further comprises a mapping algorithm utilized to partition the directory objects across the directory servers.

11. The method of claim 10 wherein the mapping algorithm utilizes the user ID to distribute the directory objects across the directory servers.

12. The method of claim 1 wherein the site further comprises a firewall located between the management server and the directory servers, the firewall comprising a security component that filters the access requests from the users.

13. The method of claim 1 wherein the site is a customer oriented management site accessible over the Internet.

14. The method of claim 13 wherein the customer oriented management site accessible over the Internet is a shopping management site.

15. The method of claim 13 wherein the customer oriented management site accessible over the Internet is an e-mail management site.

16. A computer readable storage device having computer-executable instructions for facilitating re-partitioning directory servers supporting user services in a site receiving access requests from users for user data within directory objects, the site comprising the directory servers, where at least a first directory server stores directory objects in categorical groups such that the directory objects in each group share an attribute, and a management server communicatively coupled to the directory servers having a table storing information identifying a location for each group of directory objects, the computer-readable medium having computer-executable instructions facilitating performing the steps of:
identifying a group of directory objects in one of the directory servers for migration to another directory server;
selecting a second directory server capable of storing the identified group of directory objects;
marking the identified group of directory objects to limit, for requests from users directed to reading and/or writing user data stored within respective directory objects, access to the directory objects while transferring the identified group to the second directory server, which limits read and/or write access to user data in the directory objects of the identified group during a period of time during which the identified group is temporarily marked;
transferring the identified group of directory objects from the first directory server to the second directory server;
updating the location information in the table to indicate the identified group of directory objects is located at the second directory server; and
deleting the identified group of directory objects from the first directory server.

17. The computer readable storage device of claim 16 wherein the identified group of directory objects is transferred to the second directory server without service interruption to the users of the site.

18. The computer readable storage device of claim 17 further comprising computer-executable instructions facilitating performing the steps of:
unmarking the identified group of directory objects to permit read and/or write access to the user data within directory objects after transfer of the identified group of directory objects to the second directory server is completed.

19. The computer readable storage device of claim 18 wherein write access is limited prior to transferring the identified group by denying all requested writes and updates to the directory objects in the identified group while the identified group of directory objects is marked.

20. The computer readable storage device of claim 18 wherein read access and write access is limited prior to transferring the identified group of directory objects.

21. The computer readable storage device claim 16 wherein the step of selecting the second directory server further comprises computer-executable instructions facilitating performing the steps of:
analyzing a distribution of directory objects across the directory servers; and
selecting the second directory server so that the distribution of directory objects is balanced.

22. The computer readable storage device of claim 16 wherein the directory objects comprise user authorization information, the user authorization information comprising user data relating to the users requesting access to the site.

23. The computer readable storage device of claim 22 wherein the user data comprises a unique user ID and password.

24. The computer readable storage device of claim 23 wherein the user data further comprises a notice indicating whether the user requesting access is authorized to access the site.

25. The computer readable storage device of claim 16 wherein the management server further comprises a mapping algorithm utilized to partition the directory objects across the directory servers.

26. The computer readable storage device of claim 25 wherein the mapping algorithm utilizes the user ID to distribute the directory objects across the directory servers.

27. The computer readable storage device of claim 16 wherein the site further comprises a firewall located between the management server and the directory servers, the firewall comprising a security component that filters the access requests from the users.

28. The computer readable storage device of claim 16 wherein the site is a customer oriented management site accessible over the Internet.

29. In a distributed network directory, a framework in a site for re-partitioning directory servers, the site communicatively coupled to receive and authorize access requests from users of the site to user data contained within one or more directory objects, the framework comprising:
- a set of directory servers comprising:
  - at least a first directory server for storing user data within directory objects in a number of categorical groups such that the directory objects in each group share an attribute, the first directory having an identified group selected for transfer, the identified group also being marked to indicate that read and/or write access requests by users for user data is limited for the directory objects of the identified group during a period of time during which the identified group of directory objects is temporarily marked and prior to being transferred; and
  - a second directory server for storing the identified group of directory objects; and
  - a management server communicatively coupled to the set of directory servers, the management server transferring the identified group of directory objects from the first directory server to the second directory server.

30. The framework of claim 29 wherein the management server transfers the identified group of directory objects from the first directory server to the second directory server without service interruption to user requests made by the users of the site.

31. The framework of claim 29 wherein the management server comprises a table storing information identifying a location for each group of directory objects, the table being updated after transfer of the identified group of directory objects.

32. The framework of claim 29 wherein the number of categorical groups is determined by a mapping function.

33. The framework of claim 32 wherein the mapping function comprises an equation for determining the number of groups, the equation being represented as:

$$\text{number of groups} = \frac{\text{number of directory objects}}{(\text{maximum transfer time})(\text{transfer rate})}$$

wherein:
- the number of directory objects is a maximum number of directory objects anticipated at the site;
- the maximum transfer time is a time measured in seconds for transferring a single bucket from the first directory to the second directory; and
- the transfer rate is a number of directory objects transferred per second.

34. A method as recited in claim 1, wherein identifying a group of directory objects in one of the directory servers for migration to another directory server is done in response to first determining that a number of directory objects in said one of the directory servers has increased to a level that negatively affects usability by users of a corresponding site, wherein the users are accessing user data in the group of directory objects.

35. A method as recited in claim 6, wherein selecting the second directory server so that the distribution of directory objects is balanced comprises selecting the second directory server so that the distribution of directory objects is equal into different hash buckets.

36. A method as recited in claim 1, wherein identifying a group of directory objects in one of the directory servers for migration to another directory server and selecting the second directory server so that the distribution of directory objects is done according to a migration strategy that is based at least in part on minimizing a number of directory objects to be moved.

* * * * *